(12) United States Patent
Tomita et al.

(10) Patent No.: US 8,396,868 B2
(45) Date of Patent: Mar. 12, 2013

(54) INFORMATION PROCESSING APPARATUS AND INFORMATION PROCESSING METHOD

(75) Inventors: Nobuyoshi Tomita, Tokyo (JP); Yasuaki Honda, Chiba (JP); Yasuo Endo, Chiba (JP)

(73) Assignee: Sony Corporation (JP)

( * ) Notice: Subject to any disclaimer, the term of this patent is extended or adjusted under 35 U.S.C. 154(b) by 154 days.

(21) Appl. No.: 12/799,533

(22) Filed: Apr. 27, 2010

(65) Prior Publication Data

US 2010/0293158 A1 Nov. 18, 2010

(30) Foreign Application Priority Data

May 14, 2009 (JP) ................. P2009-118084

(51) Int. Cl.
*G06F 7/00* (2006.01)
*G06F 17/30* (2006.01)

(52) U.S. Cl. ........................ 707/728; 707/723

(58) Field of Classification Search ........... 707/720–728
See application file for complete search history.

(56) References Cited

U.S. PATENT DOCUMENTS

| 2007/0039023 | A1* | 2/2007 | Kataoka | 725/46 |
| 2007/0055649 | A1* | 3/2007 | Tsuzuki et al. | 707/2 |
| 2008/0172692 | A1 | 7/2008 | Kondo et al. | |
| 2008/0215550 | A1* | 9/2008 | Fume et al. | 707/3 |
| 2009/0106261 | A1* | 4/2009 | Nagasaka et al. | 707/10 |
| 2009/0119273 | A1* | 5/2009 | Nagasaka et al. | 707/4 |

FOREIGN PATENT DOCUMENTS

JP 2008-177682 A 7/2008

* cited by examiner

*Primary Examiner* — Hosain Alam
*Assistant Examiner* — Navneet K Ahluwalia
(74) *Attorney, Agent, or Firm* — Lerner, David, Littenberg, Krumholz & Mentlik, LLP

(57) ABSTRACT

There is provided an information processing apparatus including a search processing section for causing a transmission/reception section to execute processing of transmitting a search request including a search condition to each of one or more information management devices, causing the transmission/reception section to execute processing of receiving, as a response to the search request and from each of the one or more information management devices via a network, content information corresponding to the search condition from among pieces of content information and management subject identification information for identifying the information management device which manages the content information, and correlating the management subject identification information with content identification information and content-related information that are included in the content information received by the transmission/reception section and causing a storage section to store the correlated management subject identification information, content identification information, and content-related information as a search result.

9 Claims, 8 Drawing Sheets

INPUT SEARCH KEYWORD

Abb — 710

Abbey, Edwin Austin
Abbe, Cleveland
Abbe, Ernst Karl
Abbey, Henry Eugene
Abbitt, Watkins Moorman
Abbott, Austin
Abbott, Benjamin Vaughan
Abbe, Robert
Abbey, Edward Paul
  .
  .
— 720

FIG.8

| WEIGHTING | EXTRACTING SOURCE INFORMATION |
|---|---|
| 6 | OPERATION HISTORY - TITLE |
| 5 | OPERATION HISTORY - CONTENT ADDITIONAL INFORMATION |
| 4 | SEARCH RESULT - TITLE |
| 4 | SEARCH RESULT - CONTENT ADDITIONAL INFORMATION |
| 3 | EPG - TITLE |
| 3 | EPG - CONTENT ADDITIONAL INFORMATION |
| 2 | EXTERNAL DATABASE - TITLE |
| 1 | EXTERNAL DATABASE - CAST |

FIG.9

INFORMATION PROCESSING APPARATUS AND INFORMATION PROCESSING METHOD

CROSS-REFERENCE TO RELATED APPLICATION

The present application claims priority from Japanese Patent Application No. JP 2009-118084 filed in the Japanese Patent Office on May 14, 2009, the entire content of which is incorporated herein by reference.

BACKGROUND OF THE INVENTION

1. Field of the Invention

The present invention relates to an information processing apparatus and an information processing method.

2. Description of the Related Art

In recent years, the number of service providers who provide content-related services has been increased, and there have appeared various forms of services that those service providers provide. Examples of the forms of services include a video distribution service for distributing video content, a media sales service for selling media on which content is recorded, and a media rental service for lending media.

SUMMARY OF THE INVENTION

In such circumstances, when a user decides to receive a content-related service and, for example, performs a search through the network by determining a search condition for designating content, the user acquires content-related information regardless of the form of service. After that, the user views the acquired content-related information, and in the case where the user decides to receive a service with respect to any one of the pieces of content, it is necessary for the user to access the Web page opened by a service provider which provides the service and to perform registration to receive the desired service, for example.

There are disclosed various technologies for acquiring desired content from a server (for example, refer to Japanese Patent Application Laid-Open No. 2008-177682).

According to the above-mentioned technologies, however, there was an issue that the time taken for the user from the start of searching content-related information in accordance with a search condition until execution of processing with respect to desired content was long.

In light of the foregoing, it is desirable to provide a novel and improved technology which can decrease the time taken for a user from the start of searching content-related information in accordance with a search condition until execution of processing with respect to desired content.

According to an embodiment of the present invention, there is provided an information processing apparatus which includes a transmission/reception section capable of transmitting/receiving information between each of one or more information management devices via a network, the information management device managing one or more pieces of content information each including content identification information for identifying content data and content-related information related to the content data, a storage section capable of storing information, a display section capable of displaying information, an input section capable of accepting input of information, a search processing section for performing search request control processing which causes the transmission/reception section to execute processing of transmitting a search request including a search condition the input of which is accepted by the input section to each of the one or more information management devices, performing search response control processing which causes the transmission/reception section to execute processing of receiving, as a response to the search request and from each of the one or more information management devices via the network, the content information corresponding to the search condition from among the pieces of content information and management subject identification information for identifying the information management device which manages the content information, and performing storage control processing which correlates the management subject identification information with the content identification information and the content-related information that are included in the content information received by the transmission/reception section and which causes the storage section to store the correlated management subject identification information, content identification information, and content-related information as a search result, a display control section for causing the display section to display the content-related information included in the search result with respect to each of the pieces of management subject identification information stored in the storage section, the management subject identification information being correlated with the content-related information, and a processing execution section for acquiring, when input of content selection information for selecting any one of the pieces of content-related information included in the search result is accepted by the input section, the content identification information included in the search result, the content identification information being correlated with the content-related information selected by the content selection information, and executing processing corresponding to the management subject identification information included in the search result, the management subject identification information being correlated with the content-related information with respect to the content data identified by the acquired content identification information.

When input of character string selection information for selecting at least one character string from among predetermined character strings included in the content-related information is accepted by the input section, the search processing section may set the character string selected by the character string selection information as the search condition and may perform the search request control processing, the search response control processing, and the storage control processing.

The storage section may further store a proper noun. When the display control section causes the display section to display the content-related information, the display control section may search a character string which coincides with the proper noun stored in the storage section from the content-related information and may highlight the character string which coincides with the proper noun as the predetermined character string.

The processing execution section may further correlate the content-related information selected by the content selection information with the content identification information and the management subject identification information which are correlated with the content-related information and are included in the content information, and may cause the storage section to store the correlated content-related information, content identification information, and management subject identification information as an operation history.

When input of information that the operation history stored in the storage section is to be displayed is accepted by the input section, the display control section may cause the display section to display the content-related information included in the operation history with respect to each of the pieces of management subject identification information included in the operation history, the management subject identification information being correlated with the content-related information.

When input of content selection information for selecting any one of the pieces of content-related information included in the operation history is accepted by the input section, the processing execution section may acquire the content identification information included in the operation history, the content identification information being correlated with the content-related information selected by the content selection information, and may execute processing corresponding to the management subject identification information included in the operation history, the management subject identification information being correlated with the content-related information, with respect to the content data identified by the acquired content identification information.

The storage section may further store a proper noun. When input of a character string is accepted by the input section, the display control section may extract the proper noun which includes the character string at the head portion thereof from the storage section and may cause the proper noun to be displayed on the display section. When input of designation information for designating the proper noun is accepted by the input section, the search processing section may use the proper noun designated by the designation information as the search condition.

The storage section may further store weighting information which is obtained by correlating first registration type information, second registration type information, and weighting with each other. The information processing apparatus further includes a proper noun extraction section for extracting a proper noun from the search history or the operation history stored in the storage section, setting the information indicating that the proper noun is extracted from the search result to a first type in the case of extracting the proper noun from the content-related information included in the search result, setting the information indicating that the proper noun is extracted from the operation history to the first type in the case, of extracting the proper noun from the content-related information included in the operation history, setting information indicating the classification of the proper noun within the content-related information to a second type, acquiring the weighting included in the weighting information, the weighting being correlated with the first registration type information and the second registration type information to which the first type and the second type correspond, respectively, and correlating the acquired weighting with the proper noun and causing the storage section to store the correlated acquired weighting and proper noun as proper noun acquisition information. When the display control section extracts the proper nouns from the storage section and causes the display section to display the proper nouns, the display control section may cause the proper nouns to be displayed in a manner that the proper nouns are arranged in decreasing order of weighting included in the proper noun acquisition information, the weighting being correlated with the proper noun.

According to another embodiment of the present invention, there is provided an information processing apparatus which includes one or more information management sections for managing one or more pieces of content information each including content identification information for identifying content data and content-related information related to the content data, a storage section capable of storing information, a display section capable of displaying information, an input section capable of accepting input of information, a search processing section for executing search request control processing which further outputs a search request including a search condition the input of which is accepted by the input section to each of the one or more information management sections, executing search response control processing which further accepts, as a response to the search request and from each of the one or more information management sections, input of the content information corresponding to the search condition from among the pieces of content information and management subject identification information for identifying the information management section which manages the content information, and executing storage control processing which correlates the management subject identification information with the content identification information and the content-related information that are included in the content information the input of which is accepted and which causes the storage section to store the correlated management subject identification information, content identification information, and content-related information as a search result, a display control section for causing the display section to display the content-related information included in the search result with respect to each of the pieces of management subject identification information which is stored in the storage section, the management subject identification information being correlated with the content-related information, and a processing execution section for acquiring, when input of content selection information for selecting any one of the pieces of content-related information included in the search result is accepted by the input section, the content identification information included in the search result, the content identification information being correlated with the content-related information selected by the content selection information, and executing processing corresponding to the management subject identification information included in the search result, the management subject identification information being correlated with the content-related information with respect to the content data identified by the acquired content identification information.

According to the embodiments of the present invention described above, it is possible to decrease the time taken for a user from the start of searching content-related information in accordance with a search condition until execution of processing with respect to desired content.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. Note that the description is given in the following order.
1. First embodiment
   1-1. Configuration of information processing system
   1-2. Functional configuration of information processing apparatus
      1-2-1. Basic configuration of information processing apparatus
      1-2-2. Re-search using character string within content-related information
      1-2-3. Highlighting of character string based on proper noun
      1-2-4. Recording of operation history
      1-2-5. Display of operation history
      1-2-6. Execution of processing based on operation history
      1-2-7. Simplification of search key input using proper noun
      1-2-8. Display of proper noun depending on importance
   1-3. Hardware configuration of information processing apparatus
   1-4. Flow of processing executed by information processing system
      1-5. Display example of search result
      1-6. Display example of operation history
      1-7. Display example of search condition
      1-8. Configuration example of weighting information
   1-9. Flow of processing executed by information processing apparatus
2. Modified example of embodiment
3. Summary

1. First Embodiment

Hereinafter, a first embodiment of the present invention will be described.

[1-1. Configuration of Information Processing System]

Figure 1:
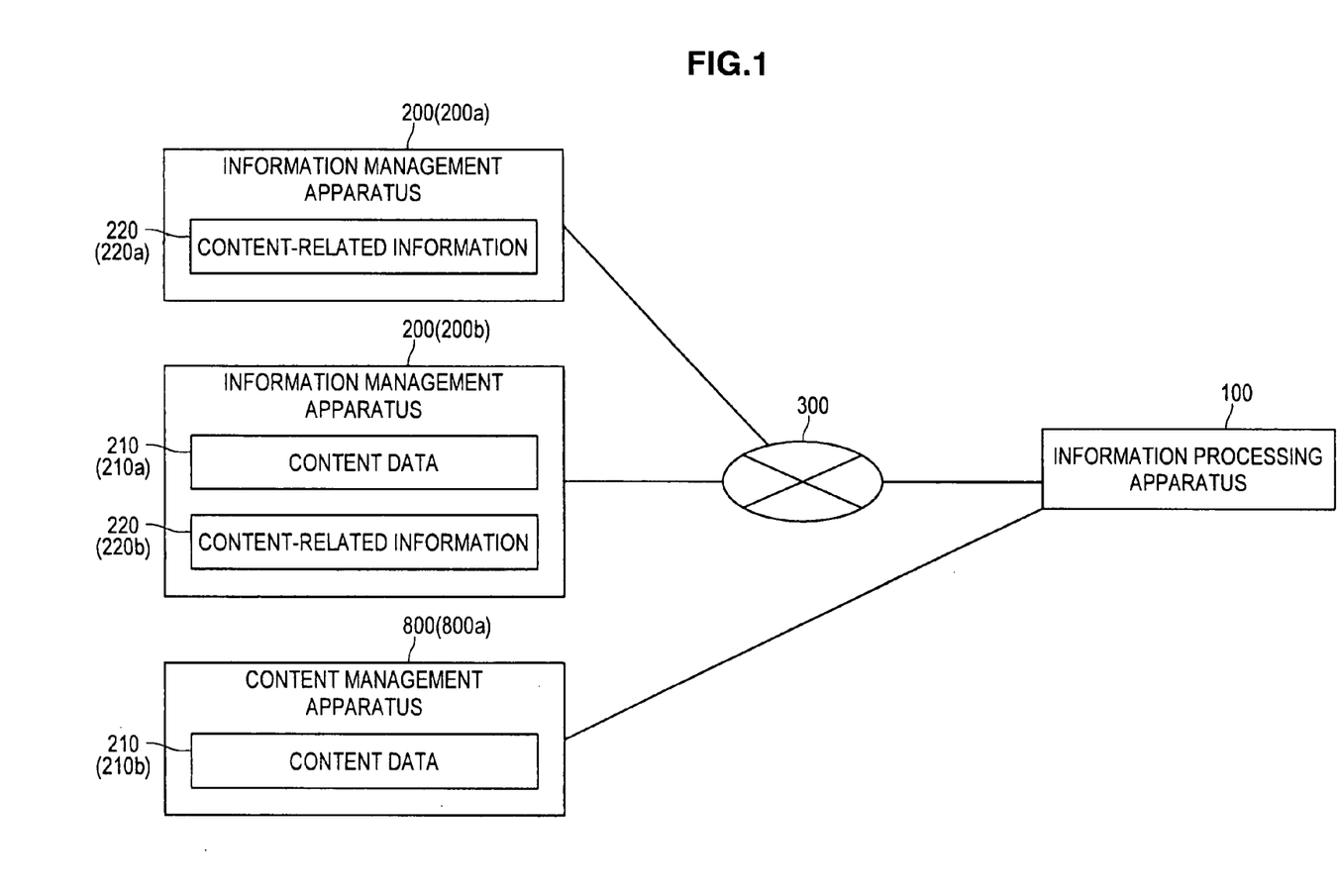
FIG. 1 is a diagram showing a configuration of an information processing system according to a present embodiment.

FIG. 1 is a diagram showing a configuration of an information processing system according to the present embodiment. As shown in FIG. 1, in the information processing system according to the present embodiment, an information management device 200 managing content-related information 220 and an information processing apparatus 100 are mutually communicable via a network 300. In FIG. 1, there are shown two information management devices 200 (information management device 200a and information management device 200b) each serving as the information management device 200, and the number of the information management device 200 is not particularly limited as long as the number is one or more. For the network 300, the Internet or the like can be used, and the kind of the network 300 is not particularly limited.

Content-related information 220 is information related to content data, and includes additional information indicating a substance of the content data, a title of the content data, data of an image (related image) illustrating a substance of the content data, and the like. The additional information and the title include, for example, text information, and the related image includes image data. In FIG. 1, there is shown an example in which each of two pieces of the content-related information 220 is managed by each information management device 200, and the number of pieces of content-related information 220 that each information management device 200 manages is not particularly limited as long as the number is one or more.

Content data 210 corresponding to the content-related information 220 includes, for example, video/audio data, still image data, moving image data, text information of program data, and the kind of the content data 210 is not particularly limited. The content data 210 may be managed by any device, and in FIG. 1, content data 210a corresponding to content-related information 220a is managed by the information management device 200b which is a different device from the information management device 200a. Further, content data 210b corresponding to content-related information 220b is managed by a content management device 800a. As shown in FIG. 1, the content data may be provided from the information management device 200b to the information processing apparatus 100 via the network 300 as in the case of the content data 210a, or may be provided from the content management device 800a to the information processing apparatus 100 not via the network 300 as in the case of the content data 210b.

[1-2. Functional Configuration of Information Processing Apparatus]

[1-2-1. Basic Configuration of Information Processing Apparatus]

Figure 2:
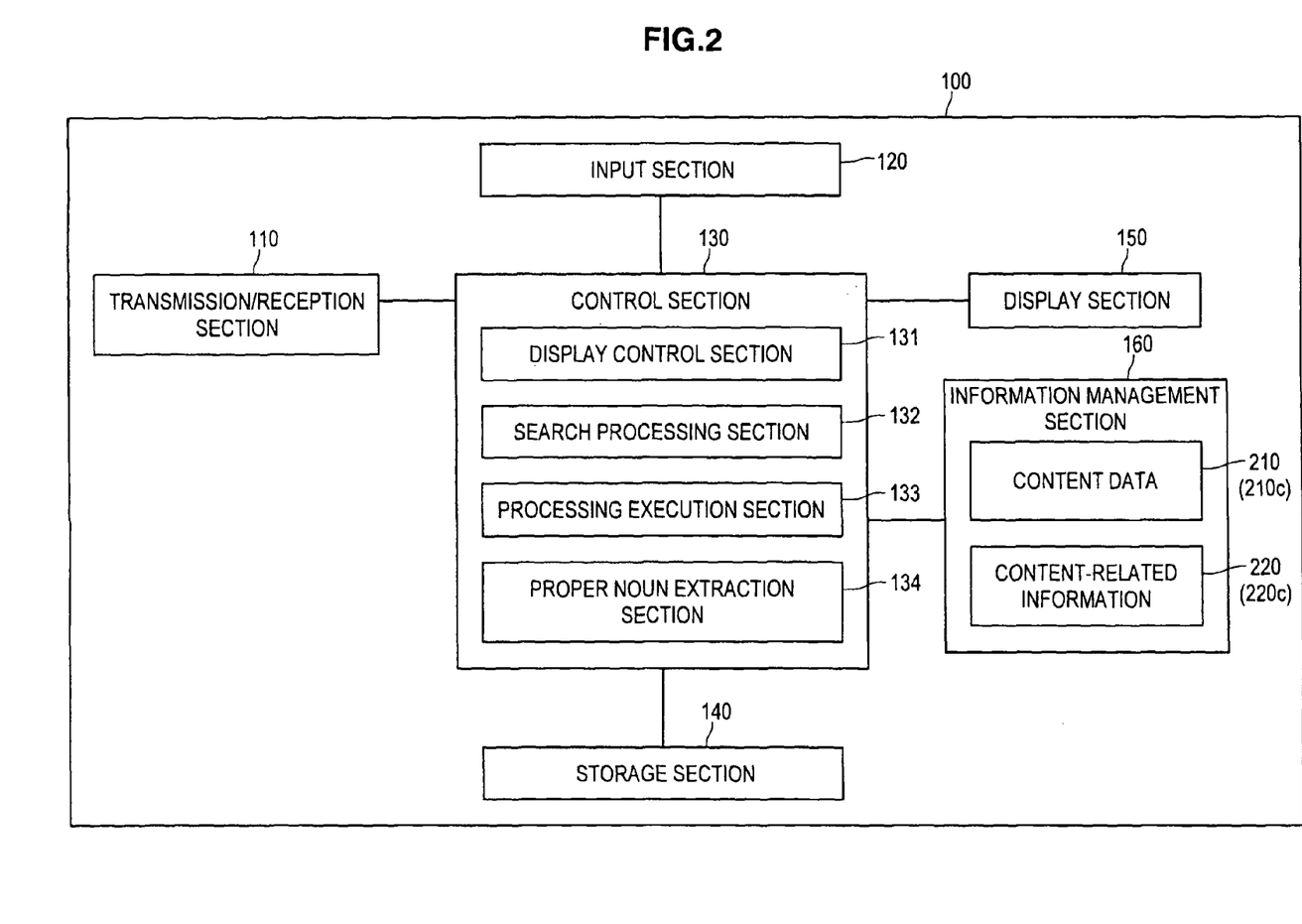
FIG. 2 is a diagram showing a functional configuration of an information processing apparatus according to the present embodiment.

FIG. 2 is a diagram showing a functional configuration of an information processing apparatus according to the present embodiment. As shown in FIG. 2, the information processing apparatus 100 includes a transmission/reception section 110, an input section 120, a control section 130, a storage section 140, and a display section 150.

The transmission/reception section 110 is capable of transmitting/receiving information between each of the one or more information management devices 200 via the network 300. The information management device 200 manages one or more pieces of content information each including content identification information for identifying the content data 210 and the content-related information 220 related to the content data 210. The content identification information is not particularly limited as long as the content identification information is information for identifying the content data 210, and, for example, there can be used URL (Uniform Resource Locator) which represents an address in which the content data 210 exists as the content identification information. Further, for example, in the case where the content data 210 is content data of a TV program, there can be also used a date and a time at which the TV program is broadcasted as the content identification information The /reception section 110 includes a communication device and the like, and corresponds to, for example, a network interface 912 which is to be described later.

The input section 120 includes an input device and the like, and is capable of accepting input of information. The input section 120 includes those each having a function of accepting input of operation information from a user, such as a mouse, a keyboard, a touch panel, a button, a switch, and a lever. Further, the input device may be, for example, a remote control means using an infrared ray or other radio waves, or an external connection unit such as a mobile phone or a PDA which is compliant with the information processing apparatus 100 operation. The user of the information processing apparatus 100 can input various kinds of data and can instruct a processing operation to the information processing apparatus 100 by operating the input device. The input section 120 corresponds to, for example, a remote operation input section 944 which is to be described later.

The storage section 140 is capable of storing information. The storage section 140 includes, for example, a storage device which is a device for storing data. The storage device includes, for example, a magnetic storage device such as an HDD (Hard Disk Drive), a semiconductor storage device, an optical storage device, and a magneto-optical storage device. The storage device is capable of storing a program and data executed by a CPU (Central Processing Unit), and data acquired from outside. The storage section 140 corresponds to, for example, a fixed recording unit 920 which is to be described later.

The display section 150 includes, for example, a display device, and is capable of displaying information. The kind of the display device is not particularly limited, and there can be used a CRT display device, a liquid crystal display device, a plasma display device, an EL display device, a lamp, and the like.

The control section 130 has a display control section 131, a search processing section 132, and a processing execution section 133. The control section 130 includes, for example, CPU and RAM (Random Access Memory), and the function thereof is realized by executing a program which CPU has read from HDD and developed in RAM. The CPU corresponds to, for example, an arithmetic unit 940 which is to be described later, and the RAM corresponds to, for example, a temporary storage unit 942 which is to be described later.

When input of a search condition is accepted by the input section 120, the search processing section 132 performs search request control processing which causes the transmission/reception section 110 to execute processing of transmitting a search request including the search condition the input of which is accepted by the input section 120 to each of the one or more information management devices 200. A display example of the search condition the input of which is accepted by the input section 120 will be described later with reference to FIG. 7.

Further, the search processing section 132 performs search response control processing which causes the transmission/reception section 110 to execute processing of receiving, as a response to the search request and from each of the one or more information management devices 200 via the network 300, the content information corresponding to the search condition from among the pieces of content information and management subject identification information for identifying the information management device 200 which manages the content information. The content information corresponding to the search condition refers to, for example, in the case where content-related information includes a character string which matches with a part of or entire search condition, content information including the content-related information. The management subject identification information is not particularly limited, and, for example, there can be used an IP (Internet Protocol) address assigned to the information management device 200 as the management subject identification information.

In addition, the search processing section 132 performs storage control processing which correlates the management subject identification information with the content identification information and the content-related information that are included in the content information received by the transmission/reception section 110 and which causes the storage section 140 to store the correlated management subject identification information, content identification information, and content-related information as a search result. A display example of the search result will be described later with reference to FIG. 5.

The display control section 131 causes the display section 150 to display the content-related information included in the search result with respect to each of the pieces of management subject identification information stored in the storage section 140, the management subject identification information being correlated with the content-related information.

When input of content selection information for selecting any one of the pieces of content-related information included in the search result is accepted by the input section 120, the processing execution section 133 acquires the content identification information included in the search result, the content identification information, the content identification information being correlated with the content-related information selected by the content selection information. The processing execution section 133 executes processing corresponding to the management subject identification information included in the search result, the management subject identification information being correlated with the content-related information with respect to the content data 210 identified by the acquired content identification information.

As the processing corresponding to the management subject identification information, for example, in the case where the management subject identification information is information for identifying a video distribution server which distributes video, there is considered processing of receiving and reproducing content data from the video distribution server. In order to receive the content data from the video distribution server, processing of transmitting a distribution request including content identification information to the video distribution server and receiving content data identified by the content identification information as a response to the request may be performed.

Further, as the processing corresponding to the management subject identification information, for example, in the case where the management subject identification information is information for identifying a media rental server which lends media, there is considered processing of transmitting a request to borrow the media in which the content data is recorded to the media rental server. In order to transmit the request to borrow the media to the media rental server, processing of transmitting a request including content identification information to the media rental server and receiving information that the content data identified by the content identification information is to be lent out as a response to the request may be performed. When the request is registered in the media rental server, the media in which the content data is recorded is lent out to a user from the media rental dealer.

In addition, as the processing corresponding to the management subject identification information, for example, in the case where the management subject identification information is information for identifying a media sales server which sells media, there is considered processing of transmitting a request to buy the media in which the content data is recorded to the media sales server. In order to transmit the request to buy the media to the media sales server, processing of transmitting a request including content identification information to the media sales server and receiving information that the content data identified by the content identification information is to be sold as a response to the request may be performed. When the request is registered in the media sales server, the media in which the content data is recorded is lent out to the user from the media sales dealer.

Further, as the processing corresponding to the management subject identification information, for example, in the case where the management subject identification information is information for identifying an EPG server which provides an EPG (Electric Program Guide), there is considered processing of setting a recording reservation of program data received from a broadcast station. The processing of setting a recording reservation of program data refers to, for example, processing of registering information that specifies a program (e.g., tuning information (channel) for specifying a broadcast station, broadcast date, broadcast start time, and broadcast end time) as reservation information in the storage section 140. When the processing of setting the recording reservation is completed and if there are the broadcast date and the broadcast start time that have reached a current date and a current time among the reservation information, respectively, the information processing apparatus 100 starts processing of recording content data provided from the broadcast station selected by the tuning information in the reservation information. If there are the broadcast date and the broadcast end time that have reached a current date and a current time among the reservation information, respectively, the information processing apparatus 100 completes the processing of recording the content data provided from the broadcast station selected by the tuning information of the reservation information.

As described above, the subject to manage the content-related information may exist outside the information processing apparatus 100, or may exist inside the information processing apparatus 100. In that case, the information processing apparatus 100 includes one or more information management sections 160 for managing one or more pieces of content information each of which includes content identification information for identifying the content data and content-related information 220c related to the content data. The information management section 160 stores, for example, EPG data as an example of the content-related information, and outputs the EPG data depending on the input search request.

The search processing section 132 executes search request control processing which further outputs the search request including the search condition the input of which is accepted by the input section 120 to each of the one or more information management sections 160. In addition, the search processing section 132 executes search response control processing which further accepts, as a response to the search request and from each of the one or more information management sections 160, input of the content information corresponding to the search condition from among the pieces of content information and management subject identification information for identifying the information management section 160 which manages the content information. Still further, the search processing section 132 executes storage control processing which correlates the management subject identification information with the content identification information and the content-related information that are included in the content information the input of which is accepted and which causes the storage section 140 to store the correlated management subject identification information, content identification information, and content-related information as a search result.

As shown in FIG. 2, the content data 210 (content data 210c) may be managed by the information management section 160 which exists inside the information processing apparatus 100. It can be considered that the content data 210c is, for example, recorded program data which has been recorded in accordance with a reservation.

[1-2-2. Re-Search Using Character String within Content-Related Information]

The information processing apparatus 100 may perform a search again, by using a character string within the content-related information 220 as a search condition. That is, there is the case where the input section 120 accepts input of character string selection information for selecting at least one character string from among predetermined character strings included in the content-related information 220. In that case, the search processing section 132 may set the character string selected by the character string selection information as the search condition and may perform the search request control processing, the search response control processing, and the storage control processing.

[1-2-3. Highlighting of Character String Based on Proper Noun]

Further, the information processing apparatus 100 may search a character string to be highlighted within the content-related information 220 based on a proper noun. That is, the storage section 140 further stores a proper noun, and, when the display control section 131 causes the display section 150 to display the content-related information 220, the display control section 131 may search a character string which coincides with the proper noun stored in the storage section 140 from the content-related information 220 and may highlight the character string which coincides with the proper noun as the predetermined character string. For example, when a link is provided to each of the highlighted predetermined character strings and a user clicks one of the highlighted predetermined character strings via the input section 120, the search processing section 132 may set the clicked character string as the search condition and then perform the search request control processing, the search response control processing, and the storage control processing.

[1-2-4. Recording of Operation History]

It has been described that the processing execution section 133 acquires the content identification information included in the search result, the content identification information being correlated with the content-related information selected by the content selection information the input of which is accepted by the input section 120. Further, it has been described that the processing execution section 133 executes processing corresponding to the management subject identification information included in the search result, the management subject identification information being correlated with the content-related information, with respect to the content data identified by the acquired content identification information. Here, the processing execution section 133 may correlate the content-related information selected by the content selection information with the content identification information and the management subject identification information which are correlated with the content-related information and are included in the content information, and may cause the storage section 140 to store the . . . correlated content-related information, . . . content identification information, and management subject identification information as an operation history. A display example of the operation history will be described later with reference to FIG. 6.

[1-2-5. Display of Operation History]

There is the case where input of information that the operation history stored in the storage section 140 is to be displayed is accepted by the input section 120. In that case, the display control section 131 may cause the display section 150 to display the content-related information included in the operation history with respect to each of the pieces of management subject identification information included in the operation history, the management subject identification information being correlated with the content-related information.

[1-2-6. Execution of Processing Based on Operation History]

There is the case where input of content selection information for selecting any one of the pieces of content-related information included in the operation history is accepted by the input section 120. In that case, the processing execution section 133 may acquire the content identification information included in the operation history, the content identification information being correlated with the content-related information selected by the content selection information. Then the processing execution section 133 may execute processing corresponding to the management subject identification information included in the operation history, the management subject identification information being correlated with the content-related information, with respect to the content data identified by the acquired content identification information.

[1-2-7. Simplification of Search Key Input Using Proper Noun]

Further, the information processing apparatus 100 is also capable of simplifying input of a search key from a user by using a proper noun. For simplifying the search key input, the storage section 140 further stores a proper noun and, when input of a character string is accepted by the input section 120, the display control section 131 extracts the proper noun which includes the character string at the head portion thereof from the storage section 140 and causes the proper noun to be displayed on the display section 150. When input of designation information for designating the proper noun is accepted by the input section 120, the search processing section 132 uses the proper noun designated by the designation information as the search condition.

[1-2-8. Display of Proper Noun Depending on Importance]

As for a display position of the proper noun displayed by the display section 150, various positions are considered, and it is convenient for a user when a proper noun which is important for the user is displayed at a position near to the display position of the search condition the input of which is accepted by the input section 120 from the user. Consequently, the information processing apparatus 100 extracts proper nouns from a search history or an operation history, and causes the extracted proper nouns to be displayed in a manner that the proper nouns are arranged from the position near to the display position of the search condition to the farther position, in decreasing order of importance to the user. A display example of the proper noun will be described later with reference to FIG. 7.

In order to display the proper nouns in decreasing order of importance, the information processing apparatus 100 includes a proper noun extraction section 134, and the storage section 140 further stores weighting information which is obtained by correlating first registration type information, second registration type information, and weighting with each other. The weighting information will be described later with reference to FIG. 8. The first registration type information and the second registration type information may be any information, and, for example, the first registration type information can be information indicating a location of the content-related information and the second registration type information can be information indicating a classification within the content-related information. As the location of the content-related information, there are considered, for example, a search history, an operation history, recorded program data, and EPG data. As the classification within the content-related information, there are considered, for example, a title of content data and additional information for describing the substance of the content data.

The proper noun extraction section 134 extracts a proper noun from the search history or the operation history stored in the storage section 140. Subsequently, in the case of extracting the proper noun from the content-related information included in the search result, the proper noun extraction section 134 sets the information indicating that the proper noun is extracted from the search result to a first type, and in the case of extracting the proper noun from the content-related information included in the operation history, the proper noun extraction section 134 sets the information indicating that the proper noun is extracted from the operation history to the first type. In addition, the proper noun extraction section 134 sets the information indicating the classification of the proper noun within the content-related information to a second type. The proper noun extraction section 134 acquires the weighting included in the weighting information, the weighting being correlated with the first registration type information and the second registration type information to which the first type and the second type correspond, respectively, and the proper noun extraction section 134 correlates the acquired weighting with the proper noun and causes the storage section 140 to store the correlated acquired weighting and proper noun as proper noun acquisition information.

The proper noun extraction section 134 may also extract the proper noun from the EPG data or the recorded program data stored in the storage section 140. In that case, in the case where the proper noun extraction section 134 extracts the proper noun from the content-related information included in the EPG data, the proper noun extraction section 134 may set the information indicating that the proper noun is extracted from the EPG data to the first type, and in the case of extracting the proper noun from the content-related information included in the recorded program data, the proper noun extraction section 134 may set the information indicating that the proper noun is extracted from the recorded program data to the first type.

When the display control section 131 extracts the proper nouns from the storage section 140 and causes the display section 150 to display the proper nouns, the display control section 131 may cause the proper nouns to be displayed in a manner that the proper nouns are arranged in decreasing order of weighting included in the proper noun acquisition information, the weighting being correlated with the proper noun. The display control section 131 may cause the extracted proper nouns to be displayed in a manner that the proper nouns are arranged from the position near to the display position of the search condition to the farther position, in decreasing order of the weighting of the proper noun.

[1-3. Hardware Configuration of Information Processing Apparatus]

Figure 3:
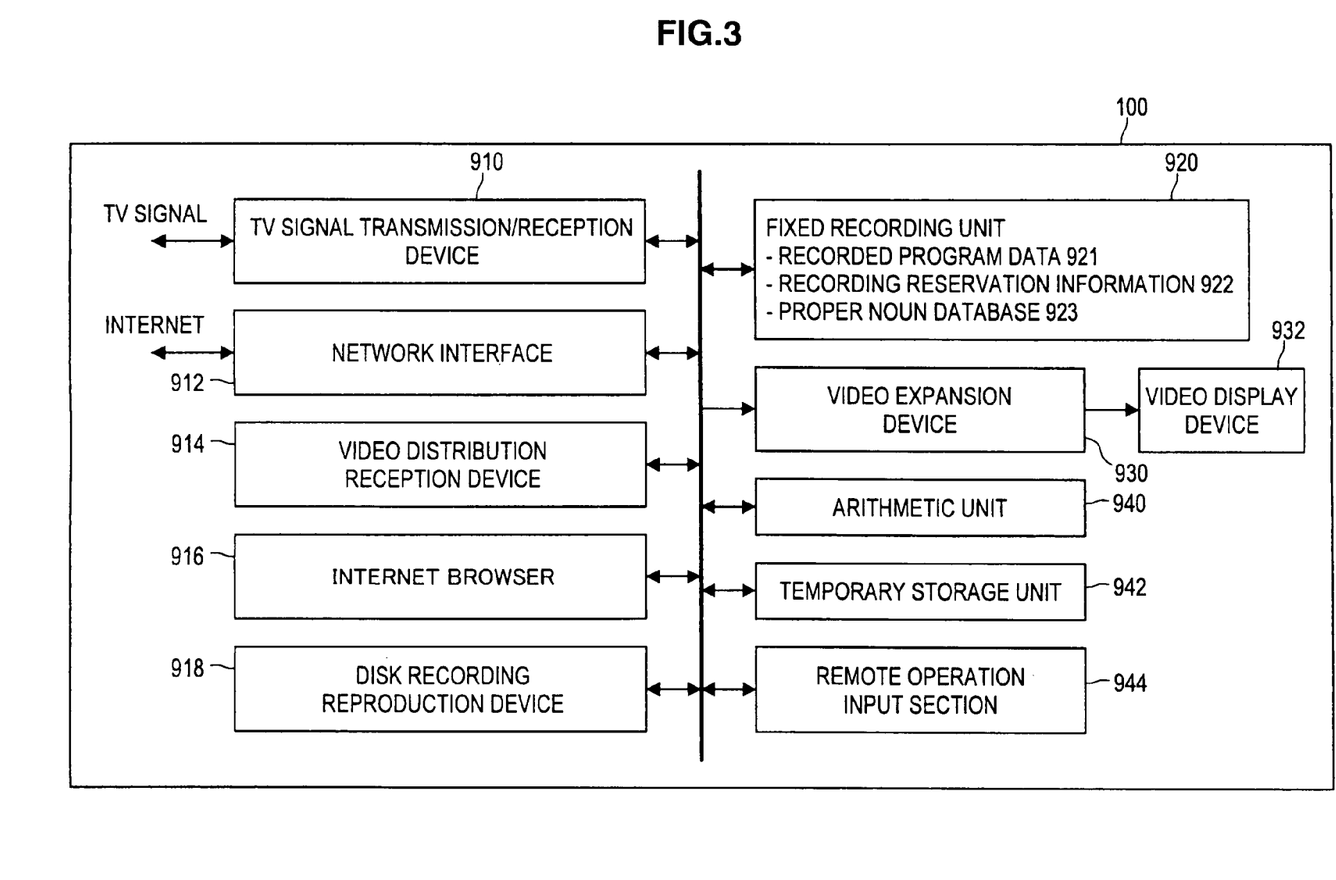
FIG. 3 is a diagram showing a hardware configuration of the information processing apparatus according to the present embodiment.

FIG. 3 is a diagram showing a hardware configuration of the information processing apparatus according to the present embodiment. Note that the hardware configuration of the information processing apparatus 100 shown in FIG. 3 is merely an example, and the hardware configuration of the information processing apparatus 100 is not limited thereto. As shown in FIG. 3, the information processing apparatus 100 according to the present embodiment has a TV signal transmission/reception device 910 as a transmission/reception device for transmitting/receiving a signal from outside, which transmits/receives a TV signal as an example of the content data 210 between a broadcast station as an example of the content management device 800. Further, the information processing apparatus 100 has a network interface 912 as an example of the network 300 for performing communication with the Internet.

The information processing apparatus 100 has a video distribution reception device 914 which uses the signals (content data 210a and content-related information 220b) transmitted/received between the information management device 200b and the network interface 912. In addition, the information processing apparatus 100 has an Internet browser 916 which is a program for performing purchase/rental of disk (media). Further, the information processing apparatus 100 has a disk recording reproduction device 918 which performs recording/reproduction of an optical disk.

In addition, the information processing apparatus 100 can save TV program data and video distribution data received by the TV signal transmission/reception device 910 in the fixed recording unit 920 and the disk recording reproduction device 918, respectively. The fixed recording unit 920 can record recording reservation information 922, a proper noun database 923, and the like in addition to the TV program data (recorded program data 921). The video signal received by the video distribution reception device 914 and the video signal recorded in the disk recording reproduction device 918 is displayed on a video display device 932 via a video expansion device 930.

The above-mentioned devices and the like included in the information processing apparatus 100 are controlled by an arithmetic unit 940, a temporary storage unit 942, and a fixed recording unit 920 based on a signal received by the remote operation input section 944 from a remote control or the like and a program saved in the fixed recording unit 920. The arithmetic unit 940 includes, for example, CPU, the temporary storage unit 942 includes, for example, RAM, and the fixed recording unit 920 includes, for example, HDD.

[1-4. Flow of Processing Executed by Information Processing System]

Figure 4:
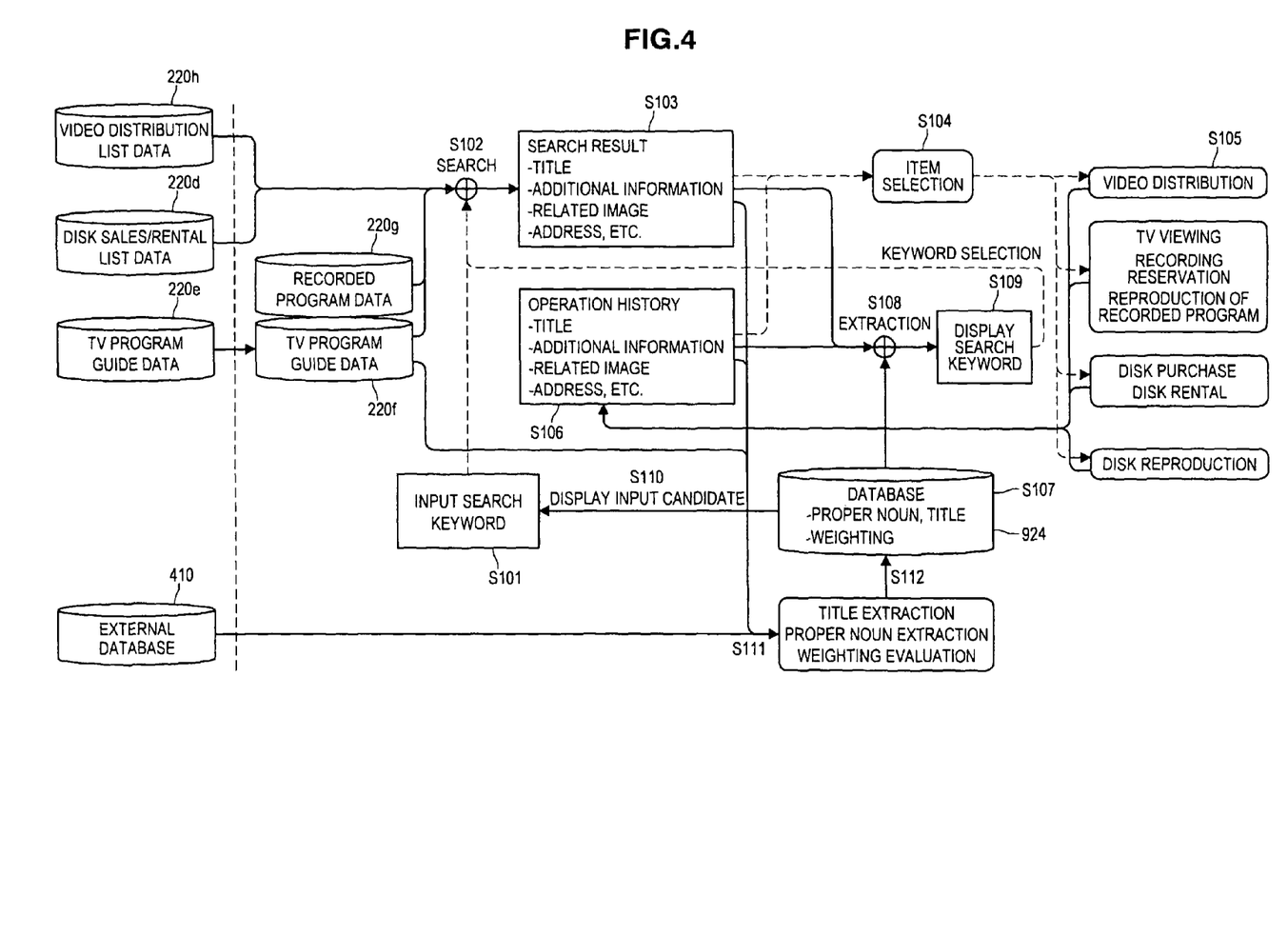
FIG. 4 is a diagram showing a flow of processing executed by the information processing system according to the present embodiment.

FIG. 4 is a diagram showing a flow of processing executed by the information processing system according to the present embodiment. In FIG. 4, a solid arrow represents a flow of data and a dashed arrow represents a flow of processing. As shown in FIG. 4, first, the information processing apparatus 100 accepts input of a search keyword as an example of the search condition from the user (step S101).

The information processing apparatus 100 searches each piece of content-related information 220 that each of a plurality of management subjects manages (step S102). As the management subject, there is considered the information management device 200 or the information management section 160. As the content-related information 220 managed by the information management device 200, there are considered video distribution list data 220h managed by a video distribution server, disk sales/rental list data 220d managed by a disk sales/rental server, TV program guide data 220e managed by an EPG server, and the like. As the content-related information 220 managed by the information management section 160, there are considered recorded program data 220g, TV program guide data 220f, and the like. The TV program guide data 220f may be data which is retrieved from the TV program guide data 220e managed by the EPG server, or may be data which is read from a recording medium or the like.

The information processing apparatus 100 displays a search result acquired by the search (step S103). The information processing apparatus 100 displays as the search result a title of content, content additional information indicating a substance of the content, content-related information such as a related image (thumbnail images) related to the content, address information as an example of content identification information for identifying the content, and others (e.g., TV channel number and broadcast hours).

When the user selects one piece of content (item) based on the search result, the information processing apparatus 100 accepts the content (item) selection (step S104) and performs processing (such as content reproduction, recording reservation, and purchase/rental of media) to the selected content in accordance with the substance of the selected content (step S105). The information processing apparatus 100 can, by recording the operation history therein and displaying the operation history (step S106), facilitate input of a search keyword at the time of performing again the processing with respect to the same content as the content to which the processing has been once performed.

The information processing apparatus 100 acquires a proper noun from a (proper noun) database 924 (step S107), and, based on the acquired proper noun, extracts a proper noun included in the content additional information of the search result/operation history (step S108). The information processing apparatus 100 creates a link from the extracted proper noun to the search operation, and displays the search result/operation history to which a link is provided. Thus, the user can perform a search again, by not only selecting processing target content from among pieces of content that are displayed, but also by selecting a proper noun which the user wants to search from among proper nouns displayed as search keywords (step S109).

Further, when the search keyword is being input at step S101, the information processing apparatus 100 searches a proper noun in which the character string matches the character string that is being input at a front part, and displays the proper nouns in the order of weighting as input candidates (step S110). The information processing apparatus 100 extracts proper nouns included in the title and the content additional information from a external database 410, the TV program guide data 220f, the search result, the operation history, and the like, adds weighting to each of the extracted proper nouns (step S111), and registers the proper nouns to which weighting is added in the database 924 (step S112).

[1-5. Display Example of Search Result]

Figure 5:
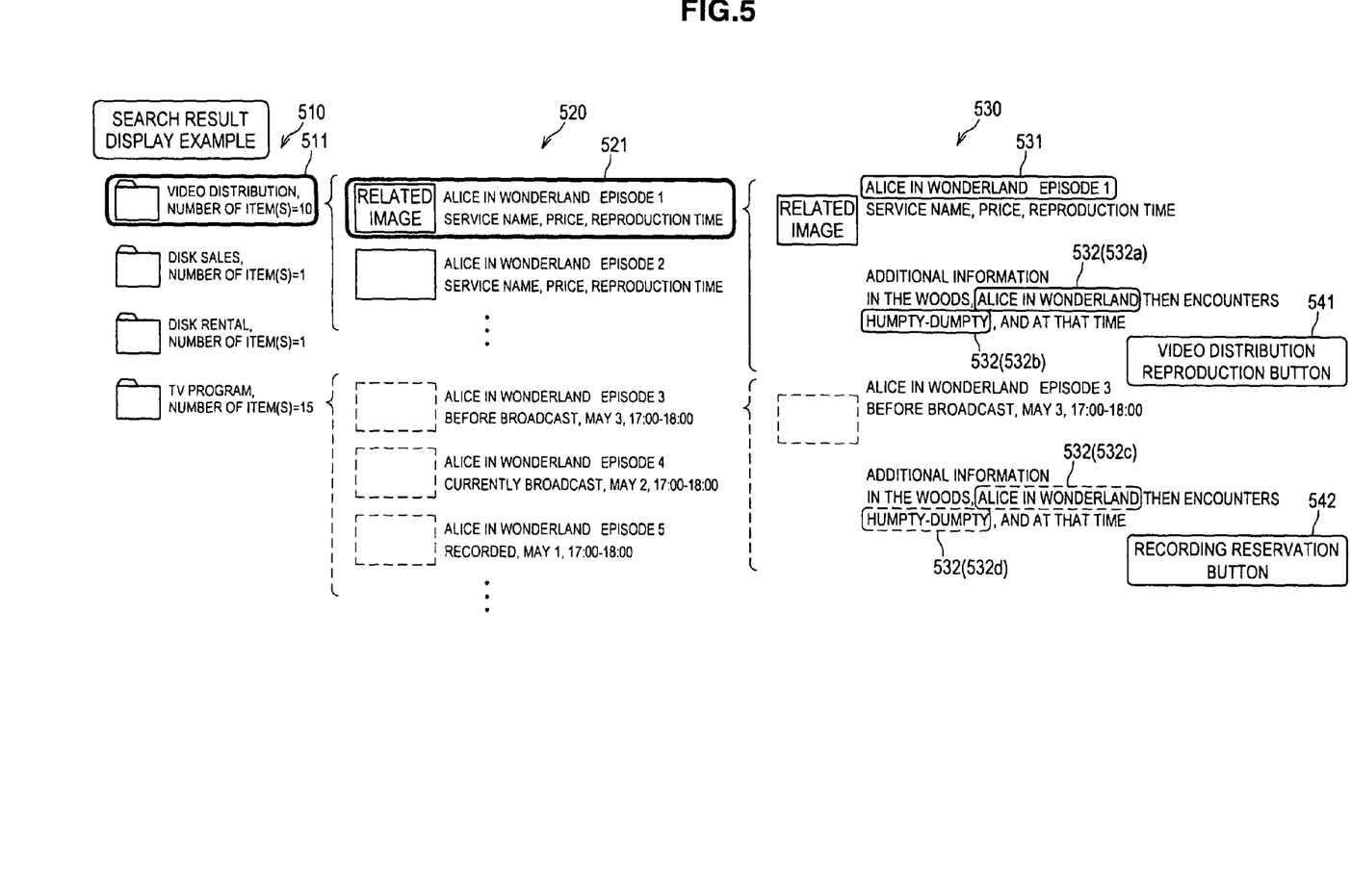
FIG. 5 is a diagram showing a display example of a search result.

FIG. 5 is a diagram showing a display example of a search result. In FIG. 5, there is shown an example in which management subject information 510, content-related information (without additional information) 520, and content-related information (with additional information) 530 are displayed as the search result. The content-related information (without additional information) 520 may not be displayed depending on the width of a display screen.

The management subject information 510 is information which is obtained by correlating the name of the management subject identified by the management subject identification information with the number of pieces of content-related information (number of items) acquired from the management subject. The number of items is not necessarily included in the management subject information 510. When the user selects any one of the pieces of management subject information 510, there may be displayed the content-related information (without additional information) 520 corresponding to the management subject identification information for identifying the selected management subject information. Further, there may be displayed the content-related information (without additional information) 520 corresponding to each piece of management subject identification information independent of the selection made by the user. In the example shown in FIG. 5, the user selects management subject information 511, and the content-related information (without additional information) 520 corresponding to the management subject identification information for identifying the management subject information 511 is displayed.

When the user selects any one of the pieces of content-related information (without additional information) 520, the content-related information (with additional information) 530 corresponding to the selected content-related information is displayed. In the example shown in FIG. 5, the user selects content-related information (without additional information) 521, and the content-related information (with additional information) corresponding to the content-related information (without additional information) 521 is displayed.

A link is provided to the proper noun extracted within the content-related information (with additional information) 530 so that the proper noun can be selected by the user. In the example shown in FIG. 5, it is possible for the user to select a proper noun 531 which is extracted from a title, a proper noun 532(532a) which is extracted from the additional information, and a proper noun 532(532b) which is extracted from the additional information, and to perform a search again by using the selected proper noun as a search key. Further, in the example shown in FIG. 5, it is possible for the user to select a proper noun 532(532c) which is extracted from the additional information and a proper noun 532(532d) which is extracted from the additional information, and to perform a search again by using the selected proper noun as a search key.

Further, a button for selecting processing corresponding to each piece of management subject information 510 may be displayed. In the example shown in FIG. 5, "video distribution reproduction button 541" is displayed, which is being correlated with the management subject information 510 of "video distribution, number of item(s)=10", and "recording reservation button 542" is displayed, which is being correlated with the management subject information 510 of "TV program, number of item(s)=15".

[1-6. Display Example of Operation History]

Figure 6:
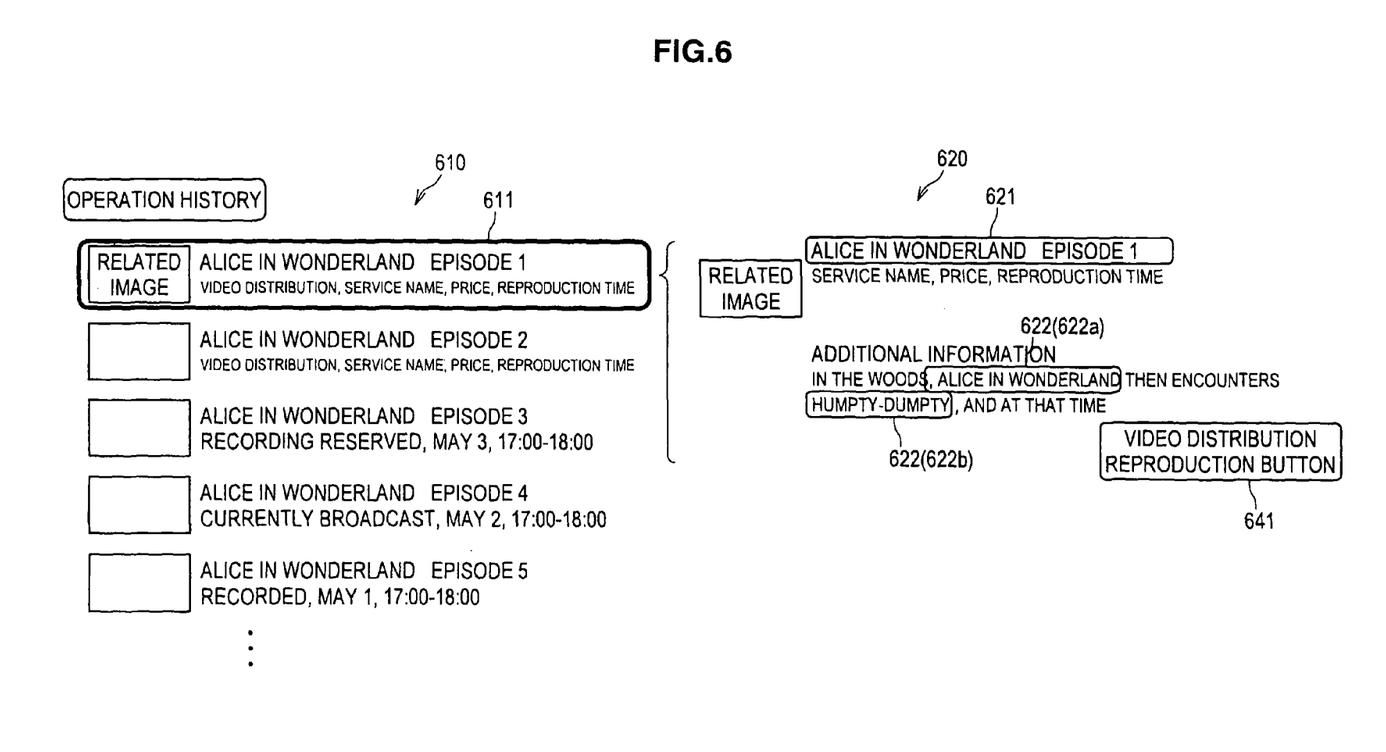
FIG. 6 is a diagram showing a display example of an operation history.

FIG. 6 is a diagram showing a display example of an operation history. In FIG. 6, there is shown an example in which content-related information (without additional information) 610 and content-related information (with additional information) 620 are displayed as the operation history. The content-related information (without additional information) 610 may not be displayed depending on the width of a display screen.

When the user selects any one of the pieces of content-related information (without additional information) 610, the content-related information (with additional information) 620 corresponding to the selected content-related information is displayed. In the example shown in FIG. 6, the user selects content-related information (without additional information) 611, and the content-related information (with additional information) corresponding to the content-related information (without additional information) 611 is displayed.

A link is provided to the proper noun extracted within the content-related information (with additional information) 620 so that the proper noun can be selected by the user. In the example shown in FIG. 6, it is possible for the user to select a proper noun 621 which is extracted from a title, a proper noun 622(622a) which is extracted from the additional information, and a proper noun 622(622b) which is extracted from the additional information, and to perform a search again by using the selected proper noun as a search key.

In the example shown in FIG. 6, "video distribution reproduction button 641" is displayed, which is being correlated with the content-related information (without additional information) 611.

[1-7. Display Example of Search Condition]

Figure 7:
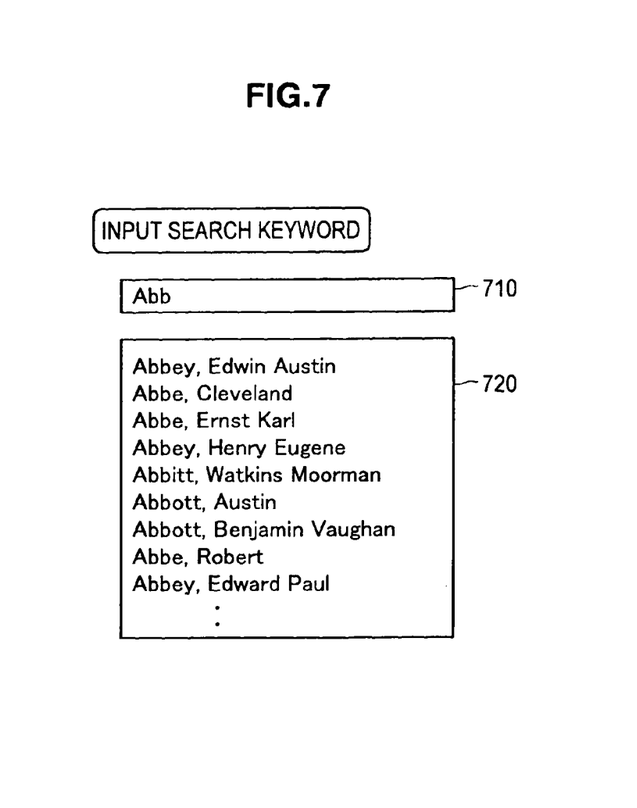
FIG. 7 is a diagram showing a display example of a search condition.

FIG. 7 is a diagram showing a display example of a search condition. In the example shown in FIG. 7, there are displayed a search condition input field 710 and a proper noun list 720. In the search condition input field 710, a search condition input by the user is displayed. The proper noun list 720 displays one or more proper nouns output from the proper noun database 923. When the user selects any one of the proper nouns from the proper noun list 720, the selected proper noun is set in the search condition input field 710. In the example shown in FIG. 7, proper nouns which begin with "Abb", which is input by the user as the search condition, is displayed in the proper noun list 720. For example, it is convenient for the user when a proper noun of higher importance to the user is displayed at, within the proper noun list 720, a position near to the position of the search condition input field 710.

[1-8. Configuration Example of Weighting Information]

Figure 8:
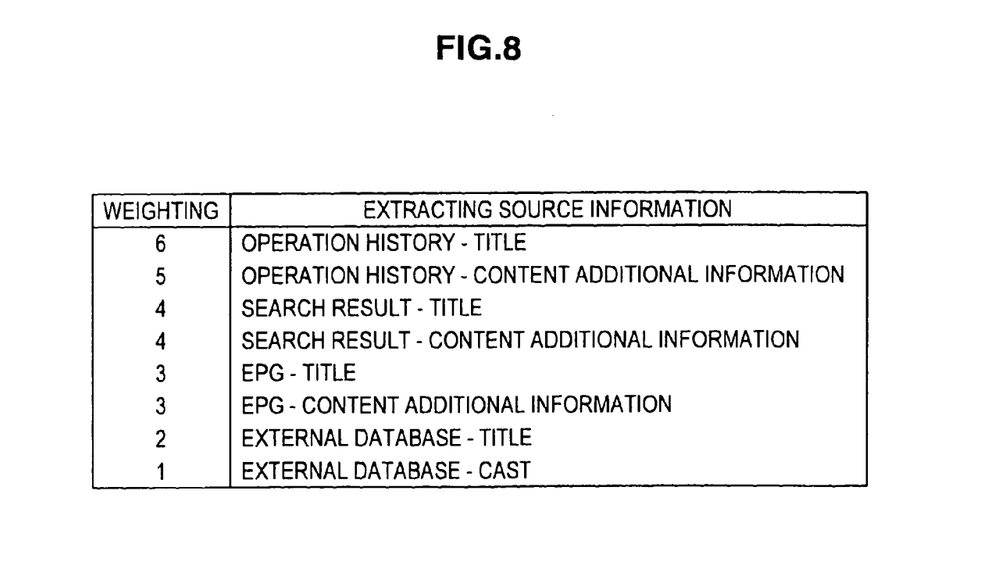
FIG. 8 is a diagram showing a configuration example of weighting information.

FIG. 8 is a diagram showing a configuration example of weighting information. In the example shown in FIG. 8, the weighting information has a configuration of weighting and extracting source information being correlated with each other. The weighting is expressed, for example, by a numerical value, and it may be that the larger the numerical value, the greater the weighting, but is not limited thereto. The extracting source information shows an example of a combination of the first registration type information and the second registration type information. As the first registration type information, there are registered "operation history", "search result", "EPG", and "external database", and as the second registration type information, there are registered "title", "content additional information", and "cast".

[1-9. Flow of Processing Executed by Information Processing Apparatus]

Figure 9:
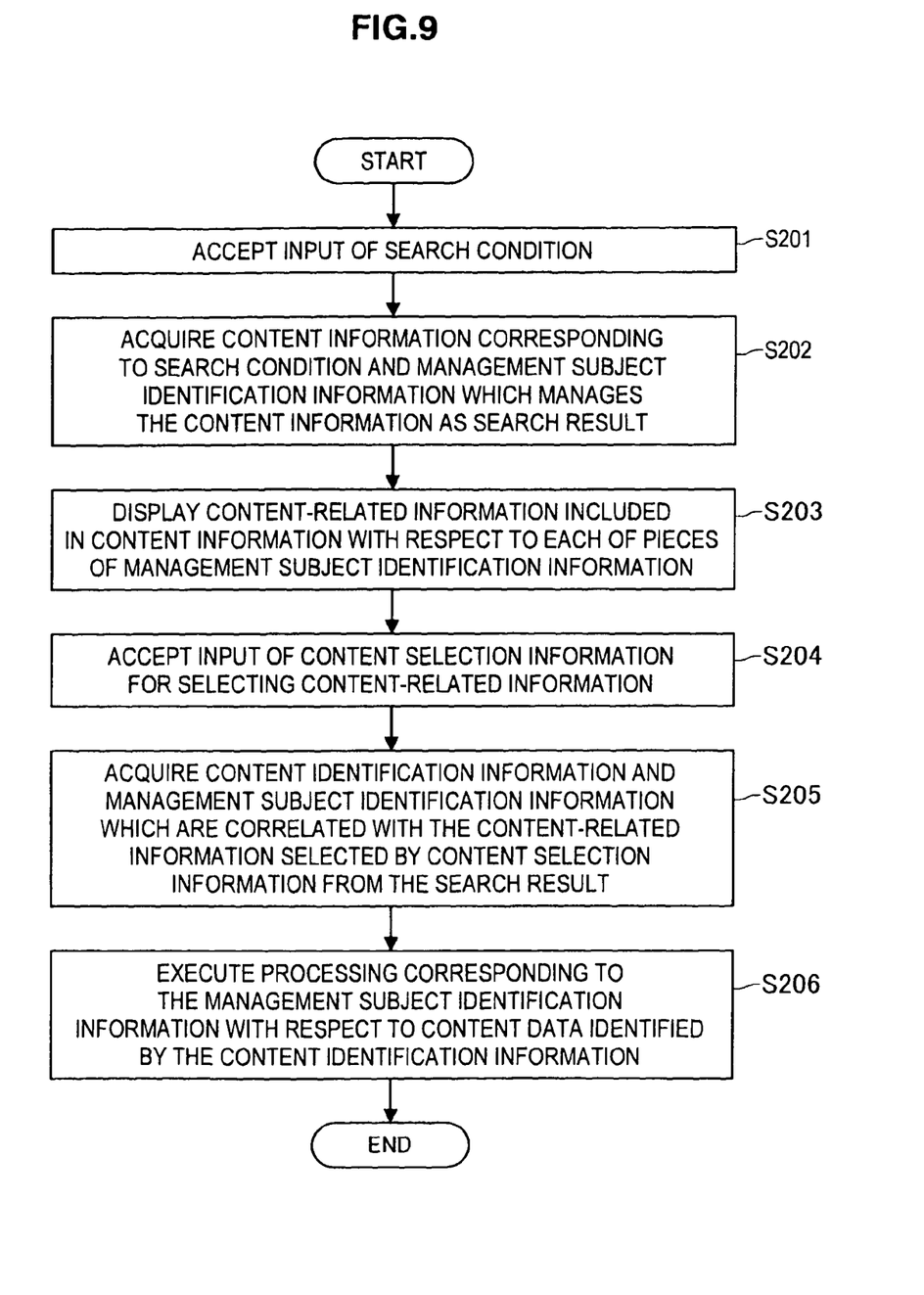
FIG. 9 is a flowchart showing a flow of processing of an information processing apparatus.

FIG. 9 is a flowchart showing a flow of processing executed by an information processing apparatus. As shown in FIG. 9, the information processing apparatus 100 accepts input of a search condition (step S201). Subsequently, the information processing apparatus 100 acquires content information corresponding to the search condition the input of which is accepted and management subject identification information which manages the content information as a search result (step S202). The information processing apparatus 100 displays content-related information included in the acquired content information with respect to each of the pieces of management subject identification information (step S203).

The information processing apparatus 100 accepts input of content selection information for selecting any one of the pieces of content-related information from the acquired pieces of content-related information (step S204). The information processing apparatus 100 acquires, from the search result, content identification information and management subject identification information which are correlated with the content-related information selected by the content selection information the input of which is accepted (step S205). The information processing apparatus 100 executes processing corresponding to the management subject identification information with respect to content data identified by the content identification information (step S206).

2. Modified Example of Embodiment

It should be understood by those skilled in the art that various modifications, combinations, sub-combinations and alterations may occur depending on design requirements and other factors insofar as they are within the scope of the appended claims or the equivalents thereof.

3. Summary

According to the present embodiment, a search can be performed by one search operation from a service providing apparatus (or service providing section), the service including video distribution, media selling, media rental, EPG data provision, recorded content reproduction, and the like. Further, when any one of the pieces of content is selected from a search result, processing corresponding to the service is performed to the selected content. Further, the user can perform a search again, by selecting a proper noun from the proper nouns included in the search result or the operation history and using the selected proper noun as a search key.

Further, according to the present embodiment, a proper noun is extracted based on the proper noun database from the content-related information recorded as the search result or the operation history, and the extracted proper noun can be used at the time of inputting a search keyword. Thus, the input of the search condition by the user can be facilitated.

Further, it is possible to perform extraction of a title of content and a proper noun from the EPG data, the search result, the operation history, and the like, and, in accordance with a parameter indicating the extracting source, the weighting is added to the title and the proper noun and then can be registered in the proper noun database. The registered proper noun is displayed at the time of inputting the search condition in accordance with the added weighting, and hence, the user can perform the input of the search condition more easily by selecting a displayed proper noun.

What is claimed is:

1. An information processing apparatus comprising:
    a processor;
    a transmission/reception section transmitting/receiving information between each of one or more information management devices via a network, the information management device managing one or more pieces of content information each including content identification information for identifying content data and content-related information related to the content data;
    a storage section storing information;
    a display section displaying information;
    an input section accepting input of information;
    a search processing section that, when executed by the processor, performs the following steps:
    performing search request control processing which causes the transmission/reception section to execute processing of transmitting a search request including a search condition the input of which is accepted by the input section to each of the one or more information management devices,
    performing search response control processing which causes the transmission/reception section to execute processing of receiving, as a response to the search request and from each of the one or more information management devices via the network, the content information corresponding to the search condition from among the pieces of content information and management subject identification information for identifying the information management device which manages the content information, and
    performing storage control processing which correlates the management subject identification information with the content identification information and the content-related information that are included in the content information received by the transmission/reception section and which causes the storage section to store the correlated management subject identification information, content identification information, and content-related information as a search result;
    a display control section that, when executed by the processor, causes the display section to display the content-related information included in the search result with respect to each of the pieces of management subject identification information stored in the storage section, the management subject identification information being correlated with the content-related information; and
    a processing execution section that, when executed by the processor, performs the following steps: acquiring, when input of content selection information for selecting any one of the pieces of content-related information included in the search result is accepted by the input section, the content identification information included in the search result, the content identification information being correlated with the content-related information selected by the content selection information, and
    executing processing corresponding to the management subject identification information included in the search result, the management subject identification information being correlated with the content-related information with respect to the content data identified by the acquired content identification information,
    wherein the storage section further stores a proper noun;
    the display control section extracts the proper noun which includes a character string at the head portion thereof from the storage section and causes the proper noun to be displayed on the display section in response to input of the character string being accepted by the input section;
    the search processing section uses the proper noun designated by designation information for designating the proper noun as the search condition in response to input of the designation information being accepted by the input section; and
    a link is provided to the proper noun extracted within the content-related information such that the proper noun is selectable by a user.

2. The information processing apparatus according to claim 1,
    wherein, when input of character string selection information for selecting the character string from among predetermined character strings included in the content-related information is accepted by the input section, the search processing section sets the character string selected by the character string selection information as the search condition and performs the search request control processing, the search response control processing, and the storage control processing.

3. The information processing apparatus according to claim 2,
    wherein, when the display control section causes the display section to display the content-related information, the display control section searches the character string from the content-related information and highlights the character string.

4. The information processing apparatus according to claim 1,
    wherein the processing execution section further correlates the content-related information selected by the content selection information with the content identification information and the management subject identification information which are correlated with the content-related information and are included in the content information, and causes the storage section to store the correlated content-related information, content identification information, and management subject identification information as an operation history.

5. The information processing apparatus according to claim 4,
wherein, when input of information that the operation history stored in the storage section is to be displayed is accepted by the input section, the display control section causes the display section to display the content-related information included in the operation history with respect to each of the pieces of management subject identification information included in the operation history, the management subject identification information being correlated with the content-related information.

6. The information processing apparatus according to claim 5,
wherein, when input of content selection information for selecting any one of the pieces of content-related information included in the operation history is accepted by the input section, the processing execution section acquires the content identification information included in the operation history, the content identification information being correlated with the content-related information selected by the content selection information and executes processing corresponding to the management subject identification information included in the operation history, the management subject identification information being correlated with the content-related information, with respect to the content data identified by the acquired content identification information.

7. The information processing apparatus according to claim 1,
wherein the storage section further stores weighting information which is obtained by correlating first registration type information, second registration type information, and weighting with each other,
wherein the information processing apparatus further includes a proper noun extraction section that, when executed by the processor, performs the following steps:
extracting the proper noun from the search history or the operation history stored in the storage section,
setting the information indicating that the proper noun is extracted from the search result to a first type in the case of extracting the proper noun from the content-related information included in the search result,
setting the information indicating that the proper noun is extracted from the operation history to the first type in the case of extracting the proper noun from the content-related information included in the operation history,
setting information indicating the classification of the proper noun within the content-related information to a second type,
acquiring the weighting included in the weighting information, the weighting being correlated with the first registration type information and the second registration type information to which the first type and the second type correspond, respectively, and
correlating the acquired weighting with the proper noun and causing the storage section to store the correlated acquired weighting and proper noun as proper noun acquisition information,
wherein, when the display control section extracts the proper nouns from the storage section and causes the display section to display the proper nouns, the display control section causes the proper nouns to be displayed in a manner that the proper nouns are arranged in decreasing order of weighting included in the proper noun acquisition information, the weighting being correlated with the proper noun.

8. An information processing apparatus comprising:
a processor;
one or more information management sections for managing one or more pieces of content information each including content identification information for identifying content data and content-related information related to the content data;
a storage section storing information;
a display section displaying information;
an input section accepting input of information;
a search processing section that, when executed by the processor, performs the following steps:
executing search request control processing which further outputs a search request including a search condition the input of which is accepted by the input section to each of the one or more information management sections,
executing search response control processing which further accepts, as a response to the search request and from each of the one or more information management sections, input of the content information corresponding to the search condition from among the pieces of content information and management subject identification information for identifying the information management section which manages the content information, and
executing storage control processing which correlates the management subject identification information with the content identification information and the content-related information that are included in the content information the input of which is accepted and which causes the storage section to store the correlated management subject identification information, content identification information, and content-related information as a search result;
a display control section that, when executed by the processor, causes the display section to display the content-related information included in the search result with respect to each of the pieces of management subject identification information which is stored in the storage section, the management subject identification information being correlated with the content-related information; and
a processing execution section that, when executed by the processor, performs the following steps: acquiring, when input of content selection information for selecting any one of the pieces of content-related information included in the search result is accepted by the input section, the content identification information included in the search result, the content identification information being correlated with the content-related information selected by the content selection information, and
executing processing corresponding to the management subject identification information included in the search result, the management subject identification information being correlated with the content-related information with respect to the content data identified by the acquired content identification information;
wherein the storage section further stores a proper noun,
the display control section extracts the proper noun which includes a character string at the head portion thereof from the storage section and causes the proper noun to be displayed on the display section in response to input of the character string being accepted by the input section, the search processing section uses the proper noun designated by designation information for designating the proper noun as the search condition in response to input of the designation information being accepted by the input section, and a link is provided to the proper noun extracted within the content-related information such that the proper noun is selectable by a user.

9. An information processing method for an information processing apparatus including a transmission/reception section transmitting/receiving information between each of one or more information management devices via a network, the information management device managing one or more pieces of content information each including content identification information for identifying content data and content-related information related to the content data, a storage section storing information, a display section displaying information, an input section accepting input of information, a search processing section, a display control section, and a processing execution section, comprising the steps of:

performing search request control processing which causes the transmission/reception section to execute processing of transmitting a search request including a search condition the input of which is accepted by the input section to each of the one or more information management devices, performing search response control processing which causes the transmission/reception section to execute processing of receiving, as a response to the search request and from each of the one or more information management devices via the network, the content information corresponding to the search condition from among the pieces of content information and management subject identification information for identifying the information management device which manages the content information, and performing storage control processing which correlates the management subject identification information with the content identification information and the content-related information that are included in the content information received by the transmission/reception section and which causes the storage section to store the correlated management subject identification information, content identification information, and content-related information as a search result, which are performed by the search processing section;

causing the display section to display the content-related information included in the search result with respect to each of the pieces of management subject identification information stored in the storage section, the management subject identification information being correlated with the content-related information, which is performed by the display control section; and acquiring, when input of content selection information for selecting any one of the pieces of content-related information included in the search result is accepted by the input section, the content identification information included in the search result, the content identification information being correlated with the content-related information selected by the content selection information, and executing processing, corresponding to the management subject identification information included in the search result, the management subject identification information being correlated with the content-related information with respect to the content data identified by the acquired content identification information, which are performed by the processing execution section;

wherein the storage section further stores a proper noun, the display control section extracts the proper noun which includes a character string at the head portion thereof from the storage section and causes the proper noun to be displayed on the display section in response to input of the character string being accepted by the input section, the search processing section uses the proper noun designated by designation information for designating the proper noun as the search condition in response to input of the designation information being accepted by the input section, and a link is provided to the proper noun extracted within the content-related information such that the proper noun is selectable by a user.

* * * * *